United States Patent
Stefanutti et al.

(10) Patent No.: US 7,554,824 B2
(45) Date of Patent: Jun. 30, 2009

(54) MULTILEVEL CONVERTER ARRANGEMENT

(75) Inventors: Philippe Stefanutti, Choisy (FR); Nicolas Hugo, Geneva (CH); Luc Meysenc, Saint Egreve (FR); Philippe Noisette, Sergy (FR); Alice Piazzesi, Baden (IT)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/025,393

(22) Filed: Feb. 4, 2008

(65) Prior Publication Data

US 2008/0175028 A1  Jul. 24, 2008

Related U.S. Application Data

(63) Continuation of application No. PCT/CH2006/000398, filed on Jul. 31, 2006.

(30) Foreign Application Priority Data

Aug. 3, 2005  (EP) .................................. 05405464

(51) Int. Cl.
*H02M 7/08* (2006.01)
(52) U.S. Cl. ........................................................ 363/69
(58) Field of Classification Search ................... 318/49, 318/113; 307/17, 11; 363/69, 70
See application file for complete search history.

(56) References Cited

U.S. PATENT DOCUMENTS

| | | | |
|---|---|---|---|
| 4,471,333 A | 9/1984 | Stephanides | |
| 4,866,344 A | 9/1989 | Ross et al. | |
| 5,629,591 A | * 5/1997 | Thevenon | .................... 318/107 |
| 6,100,663 A | 8/2000 | Boys et al. | |
| 2005/0083716 A1 | 4/2005 | Marquardt | |

FOREIGN PATENT DOCUMENTS

| | | |
|---|---|---|
| EP | 1 226 994 A2 | 7/2002 |
| WO | WO 94/06209 | 3/1994 |
| WO | WO 03/090331 A2 | 10/2003 |

OTHER PUBLICATIONS

Form PCT/ISA/210 (International Search Report) dated Oct. 18, 2006.
Form PCT/ISA/237 (Written Opinion of the International Searching Authority) dated Oct. 18, 2006.
Form PCT/IPEA/409 dated Nov. 13, 2007.
European Search Report dated Dec. 7, 2007.

* cited by examiner

*Primary Examiner*—Shawn Riley
(74) *Attorney, Agent, or Firm*—Buchanan Ingersoll & Rooney PC

(57) ABSTRACT

A power loop has a power-loop emitter and a power-loop receptor located in different housings and connected via a power-loop conductor that is at least partially exterior to both housings. By means of a current transformer inductively coupling the conductor to the emitter or receptor, the power-loop also provides for electrical insulation between the emitter and the receptor. The emitter and receptor being distant from each other offers greater flexibility in the positioning and design of the galvanic separation between the emitter and the receptor or the supplied gate-drive, respectively. For example, the local voltages of converter levels ranging up to the supply voltage of e.g. 21 kV RMS of the multilevel converter can thus be insulated from the global earth potential of the power-loop emitter. Several power-loop receptors can be coupled to the same power-loop conductor to be fed by the same power-loop emitter.

7 Claims, 2 Drawing Sheets

MULTILEVEL CONVERTER ARRANGEMENT

RELATED APPLICATIONS

This application claims priority under 35 U.S.C. §119 to EP Application 05405464.8 filed in Europe on Aug. 3, 2005, and as a continuation application under 35 U.S.C. §120 to PCT/CH2006/000398 filed as an International Application on Jul. 31, 2006 designating the U.S., the entire contents of which are hereby incorporated by reference in their entireties.

TECHNICAL FIELD

The disclosure relates to the field of power converters, and more particular to medium voltage multilevel power electronic converters for single-phase traction applications. It departs from a multilevel converter arrangement with a gate-drive unit and more than two converter levels.

BACKGROUND INFORMATION

Electric railway vehicles such as locomotives or rail coaches powered by an alternating-current (AC) supply line use a traction transformer and an AC/DC converter for converting the high voltage (15 kV or 25 kV) of the supply line to a direct-current (DC) link voltage of a few kV and to ensure a galvanic separation between the high voltage and the traction circuits. A DC link or bus at the DC link voltage feeds the drive or motor converters for traction or propulsion of the vehicle, as well as auxiliary converters for auxiliary energy supply.

In modern railway vehicle concepts, the traction transformer is usually positioned outside the main casing of the vehicle, i.e. under floor or on the rooftop. In these places however, a conventional transformer with a nominal frequency of 16.7 Hz or 50 Hz causes integration problems due to its high weight and large volume. Alternative power supply systems therefore aim at replacing the aforementioned conventional transformer by additional power electronic converters based on semiconductor technology in combination with a smaller and lighter transformer operating at a higher frequency. At the expense of switching losses in the semiconductor devices, the mass and volume of the transformer as well as the total, i.e. copper and magnetic, losses in the transformer can thus be reduced, resulting in a more efficient use of the electrical power from the supply line.

In the patent application EP-A 1 226 994, a medium frequency power supply system for rail vehicles is presented, including a classical converter topology for the bidirectional conversion of a high input AC voltage to a DC output voltage. The system comprises a primary converter composed of at least three cascaded converter modules or sections electrically connected in series, one single common transformer and a single secondary converter. Each cascade module in turn is formed by a four-quadrant converter, a 3.6 kV DC intermediate stage and a resonant converter. The secondary or output converter is a resonant switched four-quadrant converter feeding the vehicle's 1.65 kV DC link. All switching elements are advanced 6.5 kV Insulated Gate Bipolar Transistors (IGBT) with an adapted gate driver technology. Instead of passing through a DC intermediate energy storage stage, conversion from the supply line frequency to the transformer frequency can also be accomplished directly by a direct AC frequency converter, also known as a cycloconverter.

In medium voltage multilevel converters, the semiconductor devices of the different converter levels or stages are at different absolute electrical potential levels and have to be insulated against each other and against ground potential. Likewise, the conventional gate-drive units connected to the gates of and controlling the semiconductor devices via suitable low-voltage control signals as well as the power sources providing power to the gate-drive units have to be galvanically separated. Typically, opto-couplers are then used to translate the activation command from a ground referenced control circuit up to the gate-driver at floating medium voltage level.

According to the publication WO 9406209, a gate-drive circuit comprises an insulation boundary including a 2 MHz push-pull converter, a transformer and a rectifier operatively coupled to a secondary side of the transformer. The power required to switch the IGBT devices is supplied by a ground referenced 24 VAC or 30 VDC source, sent through the converter and provided to the gate-drive unit by the rectifier. As the gate-drive circuit including the insulation boundary is part of one single integrated gate-drive unit, insulation problems due to space restrictions or dielectric requirements prohibits a straightforward application of this gate-drive unit to higher voltage levels beyond approximately 10 kV RMS. On the other hand, UltraVolt Inc. (www.ultravolt.com) offers power supplies for high voltages ranging up to 40 kV and for power levels ranging from 4 to 250 Watts. However, in this case different voltage levels would each require their own dedicated power supply.

SUMMARY

A cost-effective way of controlling the power semiconductor devices at the various levels of a medium voltage multilevel converter is disclosed based on a multilevel converter arrangement and a use thereof.

A multilevel converter arrangement with $N \geq 2$ converter levels is disclosed, each level comprising a primary converter connected to a primary winding of a transformer unit of a transformer arrangement, and a secondary converter connected to a secondary winding of the transformer unit, wherein the arrangement comprises a gate-drive for controlling a controllable power semiconductor device in a primary converter with electrical power supplied to the gate-drive by a rectifier unit, wherein a power-loop with a power-loop emitter and a power-loop receptor comprising the rectifier unit, wherein the emitter is inductively coupled to the receptor via a current transformer and a power-loop conductor that is at least partially exterior to housings of both the emitter and the receptor.

BRIEF DESCRIPTION OF THE DRAWINGS

The subject matter of the disclosure will be explained in more detail in the following text with reference to exemplary embodiments which are illustrated in the attached drawings, of which schematically show.

DETAILED DESCRIPTION

In the proposed exemplary arrangement, the gate-drive is provided with the necessary power by means of a power loop with a power-loop emitter and a power-loop receptor. The emitter and receptor are located in different housings and connected via a power-loop conductor that is at least partially exterior to both housings. By means of a current transformer inductively coupling the conductor to the emitter or receptor, the power-loop also provides for electrical insulation between the emitter and the receptor. The fact that emitter and receptor are remote or physically distant from each other, and thus not integrated into one common gate-drive housing, offers greater flexibility in the positioning and design of the galvanic separation between the emitter and the receptor or the supplied gate-drive, respectively. In particular, the local voltages of converter levels ranging up to the supply voltage of e.g. 21 kV RMS of the multilevel converter can thus be insulated from the global earth potential of the power-loop emitter.

In an exemplary embodiment, several power-loop receptors are coupled to the same power-loop conductor and thus fed by the same power-loop emitter. The different receptors in turn may even supply the power received to gate-drives of different converter levels that operate at different local potentials.

In a second exemplary embodiment of the disclosure, the power-loop conductor is a standard cable with a medium or high voltage insulation in the form of a coating around a central conductor.

Figure 1:
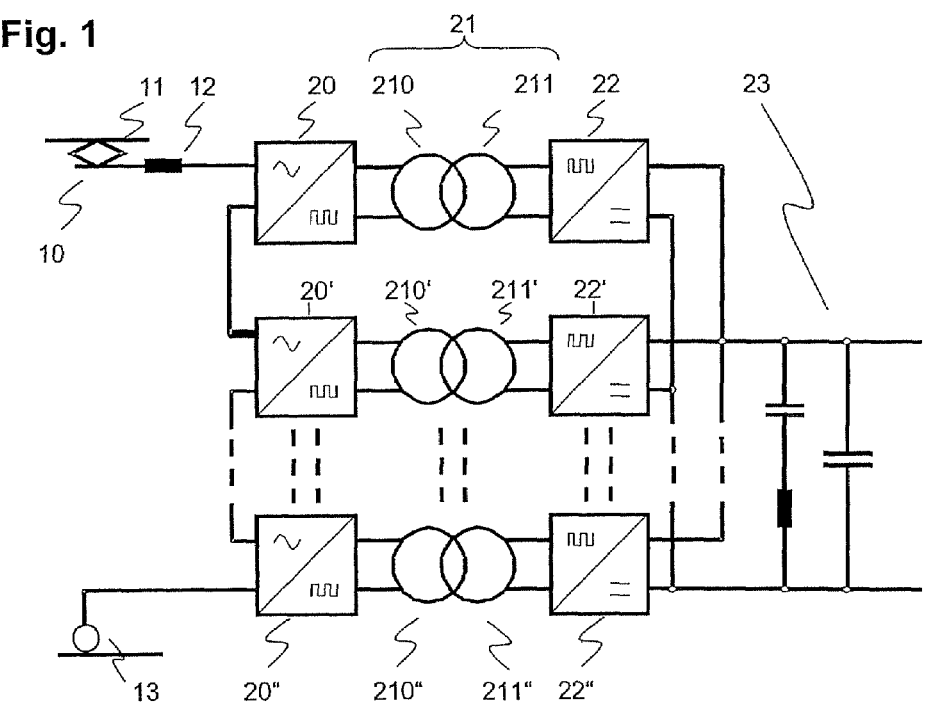
FIG. 1 shows an exemplary multilevel converter in a traction application.

FIG. 1 depicts an exemplary use of a multilevel power electronic converter in a railway vehicle. A pantograph frame of a current collector 10 is in contact with an overhead supply line 11 of a railway catenary system. The current collector is connected, via a line impedance filter 12, to a first primary converter 20. The latter is connected in series with a second primary converter 20' and further primary converters, wherein the last primary converter 20" is connected, via a wheel 13, to a rail. Each primary converter 20, 20', 20" is further connected to a respective primary winding 210, 210', 210" of a transformer unit of a traction transformer arrangement 21. The transformer units are schematically indicated by two intersecting circles and further comprise secondary windings 211, 211', 211" that in turn are connected to secondary converters 22, 22', 22". Each primary converter 20, 20', 20" and the corresponding transformer windings 210, 211; 210', 211'; 210", 211" and secondary converter 22, 22', 22" form a single AC/DC converter level. All secondary converters 22, 22', 22" are electrically connected in parallel with each other and with a DC link 23.

Figure 2:
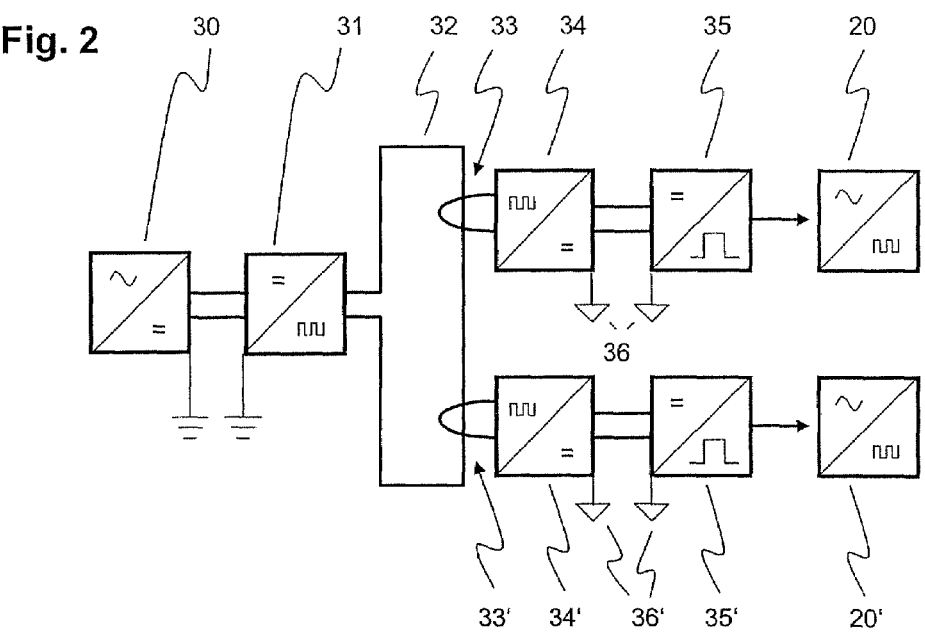
FIG. 2 shows an exemplary power-loop for supplying power to a gate-drive according to the disclosure.

FIG. 2 depicts an exemplary gate-drive power supply arrangement according to the disclosure. A main low voltage supply 30 provides a first DC voltage of e.g. 24 VDC that is fed to a DC voltage input of a power-loop emitter (square current source) 31. The latter generates a square wave AC current signal with e.g. a frequency of 25 kHz and an amplitude of 4 A, that is injected in the power-loop conductor 32. The power-loop conductor forms a primary winding of at least one current transformer 33, a secondary winding of which is connected to a power-loop receptor (regulated current rectifier) 34. The power-loop receptor converts the input square wave AC current to a regulated and supervised DC voltage of e.g. 15 VDC that is finally provided to a low-voltage input of a gate-drive 35. The latter produces the control voltages/currents that will be applied to the gate of a power semiconductor device of a first primary converter 20.

As indicated by the local earth 36, the power-loop receptor 34 and the gate drive 35 are at a local voltage level that may be anywhere between the absolute ground earth potential and the voltage of the supply line 11.

The power-loop conductor 32 of FIG. 2 forms a primary winding of a second current transformer 33', which in turn feeds a current signal to a second power-loop receptor 34' for controlling the semiconductor devices of a second converter 20' at a second local earth 36'. Likewise, further power-loop receptors at still further local voltage levels may be coupled to the power-loop conductor, typically, up to four power-loop receptors may be supplied with a power in the order of 10 W each with the aforementioned set-up. In addition, each power-loop receptor may serve the gate-drives of up to all eight power semiconductor devices of one of the primary converters 20, 20'. Equally, one single main low voltage supply 30 may feed more than one power-loop emitter.

As the problem of mutual electrical insulation in multilevel converters according to the disclosure is shifted to and solved within the power-loop, classical two-level converters in which the maximum voltage difference does not exceed e.g. 1.7 kV and in which the dielectric constraints are relatively modest can be used to build up the multilevel converter. For controlling the semiconductor devices of the latter, conventional gate-drives can be employed. The semiconductor devices themselves are bidirectional valves, typically insulated gate bipolar transistors (IGBT), bipolar controlled thyristor (BCT) or power metal oxide semiconductor field effect transistors (MOSFET). The power-loop conductor 32 can be realised as a flexible high voltage cable, arranged such as to minimize the leakage induction of the loop and thus having a length not exceeding a few meters.

Figure 3:
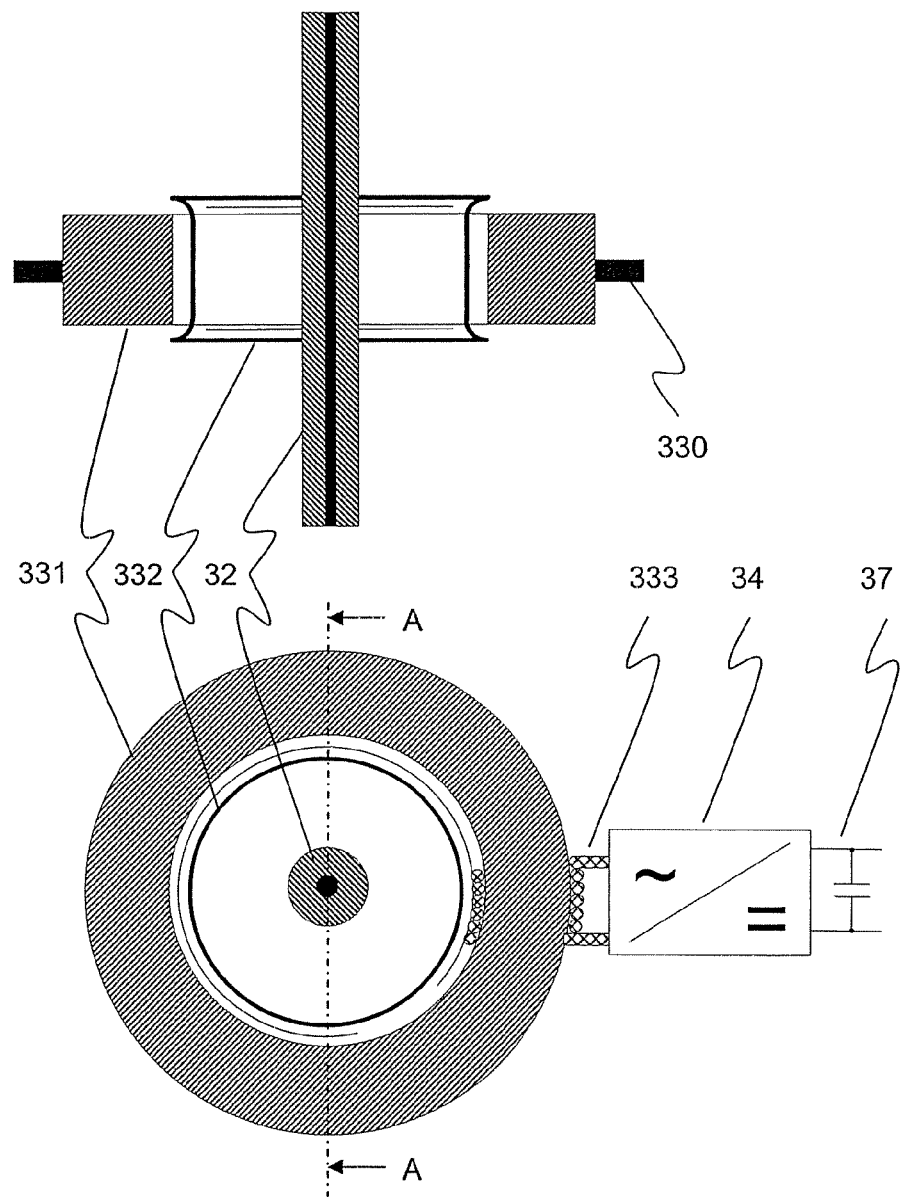
FIG. 3 shows an exemplary detail of a current transformer of the power-loop The reference symbols used in the drawings, and their meanings, are listed in summary form in the list of reference symbols. In principle, identical parts are provided with the same reference symbols in the figures.

FIG. 3 shows two detailed views of the current transformer 33 of FIG. 2. The upper drawing depicts a cross sectional view along the line AA of the lower drawing, whereas the lower drawing depicts a cross sectional view along the plane of the printed circuit board (PCB) 330 that actually carries the current transformer and the power-loop receptor 34. The power-loop conductor 32 including a high-voltage insulating coating around a conducting core is shown as a straight line, i.e. the primary winding of the current transformer comprises only one turn. A toroidal transformer core 331 is arranged in an opening of the PCB 330 and encircles the power-loop conductor 32. A secondary winding 333 with six turns is wound around the core 331 and connected to the power-loop receptor or rectifier unit 34. Concentrically to and in between the core 331 and the conductor 32, an electrically conducting screen 332, e.g., made of copper, is provided. The screen has the form of an annulus with a slightly convex cross section for screening or field grading purposes between the electrical potential of the conductor and the secondary winding. In particular in railway or other AC applications, where the local voltages of the converter levels oscillate between a minimum and a maximum value characteristic of the level and ranging up to the supply voltage of the line, this helps to avoid partial discharges between the conductor 32 and the other components of the power supply.

At the output of the power-loop receptor 34, a capacitor 37, or a plurality of capacitors arranged in a capacitor bank, is provided as a backup energy supply means for the gate drive 35. In case of failure of the power-loop emitter 31, the energy stored in the capacitor 37 still allows the gate-drive 35 to switch off the corresponding semiconductor device, resulting in a well-defined state of all semiconductor devices in the converter 20 when the emitter 31 resumes. In the abovementioned set-up and according to the expression $C=I*\Delta t/\Delta U$, electrolytic capacitors with a capacitance C of approximately 4 mF supply enough energy for the gate-drive to remain in operation for a period Δt of 20 ms at an input current I of 0.8 A and assuming a voltage drop ΔU of 4 V at the capacitors.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 current collector
11 supply line
12 line filter
13 wheel
20, 20', 20'' primary converter
21 traction transformer
210, 210', 210'' primary winding
211, 211', 211'' secondary winding
22, 22', 22'' secondary converter
23 DC link
30 main low voltage supply
31 power-loop emitter
32 power-loop conductor
33, 33' current transformer
330 printed circuit board
331 transformer core
332 conducting screen
333 secondary winding
34, 34' power-loop receptor
35, 35' gate drive
36 local earth
37 capacitor

What is claimed is:

1. A multilevel converter arrangement with N≧2 converter levels, each level comprising a primary converter connected to a primary winding of a transformer unit of a transformer arrangement, and a secondary converter connected to a secondary winding of the transformer unit, wherein the arrangement comprises:
   a gate-drive for controlling a controllable power semiconductor device in a primary converter with electrical power supplied to the gate-drive by a rectifier unit; and
   a power-loop with a power-loop emitter and a power-loop receptor comprising the rectifier unit, wherein the emitter is inductively coupled to the receptor via a current transformer and a power-loop conductor that is at least partially exterior to housings of both the emitter and the receptor.

2. The arrangement according to claim 1, wherein the power-loop emitter feeds several power-loop receptors.

3. The arrangement according to claim 1, wherein the power-loop conductor is a cable with a high or medium voltage insulation.

4. The arrangement according to claim 3, wherein the current transformer comprises a toroidal transformer core and a conductive screen arranged between the core and the power-loop conductor.

5. The arrangement according to claim 1, wherein a capacitor is provided between the rectifier unit and the gate drive as a short-term backup power supply to the gate-drive.

6. A use of a multilevel converter arrangement according to claim 1 for converting a single-phase high voltage of a supply line to a lower voltage of a DC link in railway traction applications, wherein the transformer units operate at a medium frequency above the frequency of the supply line.

7. A use of a multilevel converter arrangement according to claim 5 for converting a single-phase high voltage of a supply line to a lower voltage of a DC link in railway traction applications, wherein the transformer units operate at a medium frequency above the frequency of the supply line.

* * * * *